United States Patent
Heo

(10) Patent No.: US 11,531,108 B2
(45) Date of Patent: Dec. 20, 2022

(54) APPARATUS AND METHOD FOR DETECTING TARGET

(71) Applicant: HL KLEMOVE CORP., Incheon (KR)

(72) Inventor: Ohcheol Heo, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 960 days.

(21) Appl. No.: 16/209,948

(22) Filed: Dec. 4, 2018

(65) Prior Publication Data

US 2019/0179012 A1 Jun. 13, 2019

(30) Foreign Application Priority Data

Dec. 7, 2017 (KR) .................. 10-2017-0167776

(51) Int. Cl.
*G01S 17/86* (2020.01)
*G01S 13/34* (2006.01)
(Continued)

(52) U.S. Cl.
CPC .............. *G01S 17/86* (2020.01); *G01S 7/415* (2013.01); *G01S 13/345* (2013.01);
(Continued)

(58) Field of Classification Search
CPC ...... G01S 13/345; G01S 13/584; G01S 13/66; G01S 7/35; G01S 7/352; G01S 13/583;
(Continued)

(56) References Cited

U.S. PATENT DOCUMENTS 7,023,376 B1* 4/2006 Kuroda .................. G01S 13/348
342/195
9,400,324 B2* 7/2016 Takabayashi ............. G01S 7/35
(Continued)

FOREIGN PATENT DOCUMENTS

EP          2 273 283          1/2011
KR   10-2011-0134557       12/2011
(Continued)

OTHER PUBLICATIONS

Extended European Search Report dated Apr. 24, 2019 for European Application No. 18210375.4.
(Continued)

*Primary Examiner* — Olumide Ajibade Akonai
(74) *Attorney, Agent, or Firm* — Ladas & Parry, LLP

(57) ABSTRACT

An apparatus for detecting a target is disclosed. The apparatus of detecting a target includes: a frequency mixer configured to calculate a first beat frequency based on a transmitted signal and a received signal of first scanning and calculate a second beat frequency based on a transmitted signal and a received signal of second scanning performed with a predetermined time interval from the first scanning; a controller configured to extract a first moving component by comparing an up-chirp period frequency and a down-chirp period frequency of at least one of the first beat frequency or the second beat frequency; extract a second moving component by comparing up-chirp period frequencies or down-chirp period frequencies of the first beat frequency and the second beat frequency; and determine the moving target based on the first moving component and the second moving component.

15 Claims, 11 Drawing Sheets

(51) Int. Cl.
*G01S 13/58* (2006.01)
*G01S 7/41* (2006.01)
*G01S 17/04* (2020.01)
*G01S 17/34* (2020.01)
*G01S 17/931* (2020.01)

(52) U.S. Cl.
CPC ............ *G01S 13/583* (2013.01); *G01S 17/04* (2020.01); *G01S 17/34* (2020.01); *G01S 17/931* (2020.01)

(58) Field of Classification Search
CPC .......... G01S 7/415; G01S 17/04; G01S 17/58; G01S 17/931; G01S 13/589; G01S 13/931; G01S 15/931; G01S 7/292; G01S 7/4911; G01S 7/493; G01S 17/34; G01S 17/32; G01S 7/4814; G01S 13/88; G01S 13/42; G01S 13/343; G01S 3/66; G01S 2013/93271; G01S 7/354; G01S 13/34; G01S 13/58

See application file for complete search history.

(56) References Cited

U.S. PATENT DOCUMENTS

| | | | | |
|---|---|---|---|---|
| 10,036,805 | B2* | 7/2018 | Lee | G01S 13/32 |
| 11,099,269 | B2* | 8/2021 | Lim | G01S 13/584 |
| 2007/0109176 | A1 | 5/2007 | Nakanishi et al. | |
| 2010/0271258 | A1* | 10/2010 | Takabayashi | G01S 13/931 342/107 |
| 2014/0184437 | A1 | 7/2014 | Takabayashi et al. | |
| 2019/0025419 | A1* | 1/2019 | Shiba | G01S 15/34 |
| 2019/0212430 | A1* | 7/2019 | Akamine | G01S 7/352 |

FOREIGN PATENT DOCUMENTS

| | | |
|---|---|---|
| KR | 10-2014-0088240 | 7/2014 |
| KR | 10-2015-0052556 | 5/2015 |
| KR | 10-2015-006369 | 6/2015 |
| KR | 10-2017-0133804 | 12/2017 |

OTHER PUBLICATIONS

Office Action dated Sep. 24, 2021 for Korean Patent Application No. 10-2017-0167776 and its English translation from Global Dossier.

Engin Hyun et al.: "Moving Target Detection Algorithm for FMCW Automotive Radar", Journal of the Institute of Electronics Engineers of Korea, Jul. 15, 2010, see pp. 367-372, (English translation by Google Translate).

Notice of Allowance dated Sep. 22, 2022 for Korean Patent Application No. 10-2017-0167776 and its English translation from Global Dossier.

* cited by examiner

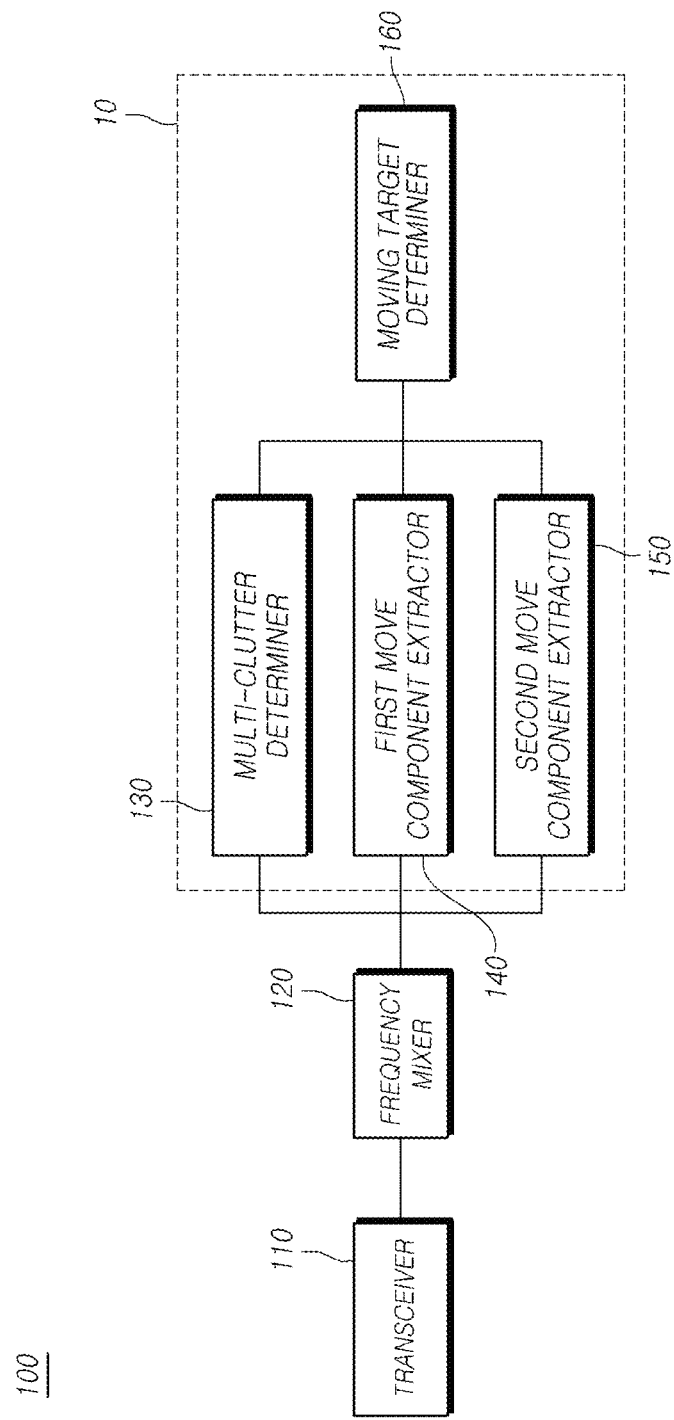

<UP/DOWN (SHIFTED) DIFFERENCE FIRST MOVE COMPONENT>

APPARATUS AND METHOD FOR DETECTING TARGET

CROSS REFERENCE TO RELATED APPLICATION

This application claims priority from Korean Patent Application No. 10-2017-0167776, filed on Dec. 7, 2017, the entire disclosure of which is hereby incorporated by reference.

BACKGROUND

1. Field

The present disclosure relates to an apparatus and method for detecting a target and, more particularly, to a technology that detects a moving target in a multi-clutter environment.

2. Description of the Related Art

Target detection devices such as a radar detect a target by transmitting a signal to detect the target and analyzing a reflecting signal of the transmitted signal from the target. However, these target detection devices have difficulty in detecting a moving target in a multi-clutter environment with much clutter such as metallic tunnels and guard rails due to signals that are reflected by the clutter.

SUMMARY OF THE DISCLOSURE

Accordingly, an aspect of the present disclosure is to provide an apparatus for detecting a target, the apparatus having improved detection performance.

Another aspect of the present disclosure is to provide a technology that detects a moving target in a multi-clutter environment.

Another aspect of the present disclosure is to provide a technology that detects a moving target in a multi-clutter environment based on the speed of a vehicle equipped with an apparatus for detecting a moving target.

According to an aspect of the present disclosure, an apparatus for detecting a moving target includes: a frequency mixer configured to calculate a first beat frequency based on a transmitted signal and a received signal of first scanning and calculate a second beat frequency based on a transmitted signal and a received signal of second scanning performed with a predetermined time interval from the first scanning; and a controller configured to extract a first moving component by comparing an up-chirp period frequency and a down-chirp period frequency of at least one of the first beat frequency or the second beat frequency; extract a second moving component by comparing up-chirp period frequencies or down-chirp period frequencies of the first beat frequency and the second beat frequency; and determine whether there is the moving target based on the first moving component and the second moving component.

According to another aspect of the present disclosure, an apparatus for detecting a moving target includes: a frequency mixer configured to calculate a first beat frequency based on a transmitted signal and a received signal of first scanning and calculate a second beat frequency based on a transmitted signal and a received signal of second scanning performed with a predetermined time interval from the first scanning; and a domain control unit configured to control at least one driver assist system module mounted to a vehicle, in which the domain control unit is configured to extract a first moving component by comparing an up-chirp period frequency and a down-chirp period frequency of the first beat frequency; extract a second moving component by comparing up-chirp period frequencies or down-chirp period frequencies of the first beat frequency and the second beat frequency; and determine whether there is the moving target based on the first moving component and the second moving component.

According to another aspect of the present disclosure, a method of detecting a moving target includes: calculating a first beat frequency based on a transmitted signal and a received signal of first scanning and calculating a second beat frequency based on a transmitted signal and a received signal of second scanning performed with a predetermined time interval from the first scanning; extracting a first moving component by comparing an up-chirp period frequency and a down-chirp period frequency of at least one of the first beat frequency or the second beat frequency; extracting a second moving component by comparing up-chirp period frequencies or down-chirp period frequencies of the first beat frequency and the second beat frequency; and determining whether there is the moving target based on the first moving component and the second moving component.

According to an embodiment of the present disclosure, it is possible to improve the sensing performance of an apparatus for detecting a target.

According to another embodiment of the present disclosure, it is possible to detect a moving target in a multi-clutter environment.

According to another embodiment of the present disclosure, it is possible to detect a moving target in a multiple clutter environment based on the speed of a vehicle equipped with an apparatus for detecting a moving target.

BRIEF DESCRIPTION OF THE DRAWINGS

The above and other aspects, features and advantages of the present disclosure will be more apparent from the following detailed description taken in conjunction with the accompanying drawings, in which:

FIG. 1B is a block diagram of an apparatus for detecting a target according to an embodiment of the present disclosure.

DETAILED DESCRIPTION OF THE EXEMPLARY EMBODIMENTS

Figure 1A:
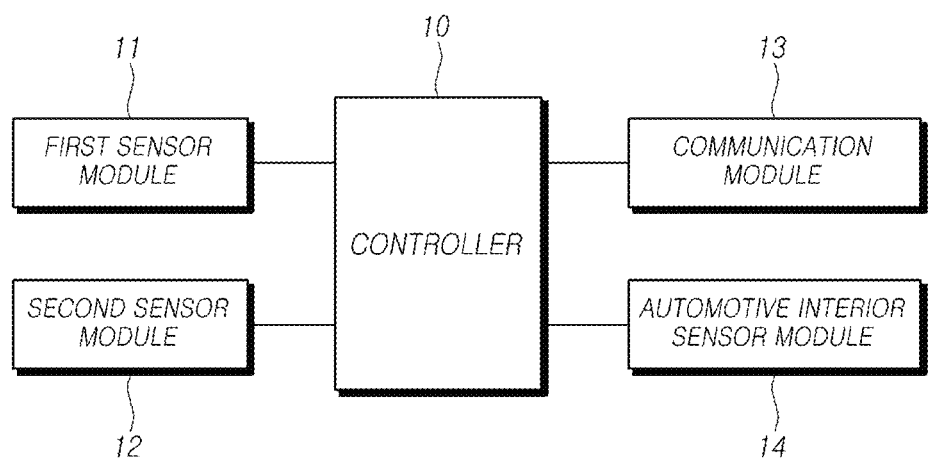
FIG. 1A is a block diagram of a vehicle according to an embodiment of the present disclosure.

The present disclosure may have various modifications and embodiments, and thus particular embodiments illustrated in the drawings will be described in detail in the following description. However, it should be understood that there is no intent to limit the present disclosure to the particular forms disclosed, but on the contrary, the present disclosure is to cover all modifications, equivalents, and alternatives falling within the spirit and scope of the disclosure. Further, in the description of the present disclosure, when it is determined that the detailed description of the related well-known technologies unnecessarily make the subject matter of the present disclosure unclear, the detailed description will be omitted. A singular expression as used in the specification and the claims should be construed as meaning "one or more" unless indicated otherwise.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

A vehicle may be a concept including a car and a motorcycle in this specification. Further, the vehicle may be a concept including all of an internal combustion engine vehicle having an engine as a power source, a hybrid vehicle having an engine and an electric motor as power sources, and an electric vehicle having an electric motor as a power source. A car is exemplified as the vehicle in the following description.

The term "forward" means the forward-driving direction of a vehicle and the term "rearward" means the rearward-driving direction of a vehicle. Further, the term "left" of a vehicle means the left side in the forward-driving direction of a vehicle and the term "right" of a vehicle means the right side in the forward-driving direction of a vehicle. Further, the term "rear-cross area" of a vehicle means the left side or the right side in the rearward-driving direction of the vehicle.

FIG. 1A is a block diagram of a vehicle according to an embodiment of the present disclosure.

Referring to FIG. 1A, a vehicle may include a controller 10, a first sensor first sensor module 11, a second sensor module 12, a communication module 13, and an automotive interior sensor module 14.

For example, the first sensor module 11 may include an image sensor configured to have a visual field inside or outside a vehicle and capture image data and a processor configured to process the captured image data.

For example, the image sensor may be disposed on a vehicle to have a visual field inside or outside the vehicle. At least one image sensor can be mounted at a predetermined position on the vehicle to secure visual fields for the front, side, or rear area of the vehicle.

Image information obtained from the image sensor is configured in image data, so it may mean image data captured by the image sensor. In the following description, the image information taken from the image sensor means image data captured by the image sensor.

The image data captured by the image sensor can be processed by the processor. The processor can be operated to process the image data captured by the image sensor.

The processor can be achieved, as hardware, by at least one of electric units that can process image data and perform other functions such as controllers, micro-controllers, and microprocessors (e.g., computer, etc.).

The second sensor module 12 means another sensor module except for the first sensor module 11 that captures images. For example, a plurality of second sensor module 12 may be disposed on a vehicle to have sensing areas inside or outside the vehicle and can capture sensing data. The second sensor modules 12, for example, may be radar sensors, lidar sensors, and ultrasonic sensors. The second sensor module 12 may not be provided or one or more second sensor modules 12 may be provided.

The communication module 13 performs a function for vehicle-to-vehicle, vehicle-to-infra, vehicle-to-server, and internal vehicle communication, etc. To this end, the communication module 13 may be composed of a transmission module and a reception module. For example, the communication module 13 may include a broadcasting reception module, a wireless internet module, a near field communication module, a geographic information module, an optical communication module, and a V2X communication module.

The broadcasting reception module receives broadcasting signals or broadcasting-related information from an external broadcasting management server through broadcasting channels. The broadcasting includes at least one of radio broadcasting or TV broadcasting. The wireless internet module is a module for wireless internet connection and may be provided inside or outside a vehicle. The near field communication module, which is for short range communication, can support short range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (Wireless USB).

The geographic information module is a module for obtaining location information of a vehicle and a Global Positioning System (GPS) is a representative example. For example, when a vehicle is equipped with a GPS module, it can obtain its location using a signal from a GPS satellite. Meanwhile, depending on embodiments, the location module may be a component not included in the communication module 13, but included in the automotive internal sensor module 14.

The optical communication module may include a light transmitter and a light receiver. The light transmitter and the light receiver can transmit and receive information by converting light signals into electrical signals.

The V2X communication module is a module for wireless communication with a server, another vehicle, or an infrastructure device. In this embodiment, the V2X communication module means that a vehicle exchanges information with an object such as another vehicle, a mobile device, or a road through wire/wireless networks, or the technology. The V2X communication module may include the concepts of Vehicle-to-Vehicle (V2V) communication, Vehicle-to-Infrastructure (V2I) communication, Vehicle-to-Nomadic Device (V2N) communication, and (Vehicle to Pedestrian (V2P) communication. The V2X communication module is based on Dedicated Short-Range Communications (DSRC) and can use IEEE Wireless Access in Vehicular Environment (WAVE) or IEEE 802.11p communication technology using a band of 5.9 GHz recently established by IEEE, but is not limited thereto and should be understood as including all kinds of V2V communication to be developed at present or in future.

The automotive interior sensor module 14 means a sensor for sensing interior information of a vehicle. For example, the automotive interior sensor module 14 may mean a torque sensor for sensing steering torque, a steering angle sensor for sensing a steering angle, a motor position sensor that senses information about a steering motor, a vehicle speed sensor, a vehicle motion sensor that senses movement of a vehicle, and a vehicle posture sensor. Further, the automotive interior sensor module 14 may mean sensors for sensing various data in a vehicle other than the above sensors and one or more automotive interior sensor modules may be provided.

The controller 10 can obtain data from at least one of the first sensor module 11, the second sensor module 12, the communication module 13, and the automotive interior sensor module 14 and can control various operations of a vehicle based on the obtained data. Alternatively, the controller 10 can obtain and process image data from the first sensor module 11. Further, the controller 10 can receive and process sensing data from the non-mage sensor module 12. Alternatively, the controller 10 can obtain and process data from the automotive interior sensor module 14 or the communication module 13. To this end, controller 10 may include at least one processor.

Further, the controller 10 can control the operation of the first sensor module 11, the second sensor module 12, the communication module 13, and the automotive interior sensor module 14. Alternatively, the controller 10 can control the operation of various driver assist systems in a vehicle.

A radar module that is used in the present disclosure may include at least one radar sensor unit, for example, one or more of a front radar sensor disposed on the front of a vehicle, a rear radar sensor disposed on the rear of the vehicle, and a side or rear-cross radar sensor disposed on the sides of a vehicle. The radar sensor or radar sensor system processes data by analyzing transmitted signals or received signals, so it can detect information about objects and may include an Electronic Control Unit (ECU) or a processor for the detection. A communication link such as an appropriate automotive network bus may be used for data transmission or signal communication from the radar sensor to the ECU.

The radar sensor includes one or more transmitting antennas that transmit radar signals and one or more receiving antennas that receive reflecting signals from an object.

The radar antenna sensor according to the embodiment may employ a multi-antenna arrangement and Multiple Input Multiple Output (MIMO) signal transmission/reception method to form a virtual antenna aperture larger than the actual antenna aperture.

For example, a 2D-antenna array is used to secure precision and resolution of horizontal and vertical angles. By using a 2D-antenna array, it is possible to transmit/receive signals through two-time separate (time-multiplexed) horizontal and vertical scanning and to use MIMO separately from 2D-radar horizontal and vertical scanning (time-multiplexing).

In detail, the radar sensor of the embodiment may employ a 2D-antenna array composed of a transmitting antenna unit including a total of twelve transmitting antennas Tx and a receiving antenna unit including a total of sixteen receiving antennas Rx, and as a result, it may have a total of one hundred and ninety two virtual receiving antennas.

The transmitting antenna unit includes three transmitting antenna groups each including four transmitting antennas, in which a first transmitting antenna group may be vertically spaced apart a predetermined distance from a second transmitting antenna group and the first or second transmitting antenna group may be horizontally spaced apart a predetermined distance D from a third transmitting antenna group.

The receiving antenna unit may include four receiving antenna groups each including four receiving antennas, in which the receiving antenna groups are vertically spaced apart from one another. Further, the receiving antenna unit may be disposed between the horizontally spaced first and third transmitting antenna groups.

In another embodiment, antennas of the radar sensor are arranged in a 2D-antenna array, and for example, each antenna patch has Rhombus lattice arrangement, thereby being able to reduce unnecessary side lobes.

Alternatively, the 2D-antenna arrangement may include a V-shape antenna array in which a plurality of radial patches are arranged in a V-shape, and in detail, may include two V-shape antenna arrays. In this configuration, a single feed is achieved by the apex of each V-shape antenna array.

Alternatively, the 2D-antenna arrangement may include an X-shape antenna array in which a plurality of radial patches are arranged in an X-shape, and in detail, may include two X-shape antenna arrays. In this configuration, a single feed is achieved by the center of each X-shape antenna array.

A MIMO antenna system may be used for the radar sensor according to the embodiment to secure vertical and horizontal sensing accuracy or resolution.

In detail, in a MIMO system, each of transmitting antennas can transmit signals that have independent different waveforms. That is, the transmitting antennas each transmit a signal having an independent waveform different from those of the other transmitting antennas, so receiving antennas can determine which transmitting antennas the reflecting signals that are reflected by an object are transmitted from due to the different waveforms.

The radar sensor according to the embodiment may include a substrate including a transmitting/receiving antenna, a radar housing accommodating a circuit, and a radome forming the external shape of the radar housing. The radome is made of a material that can reduce attenuation of transmitted and received radar signals and may be formed as a front or rear bumper, a grill, or a side of a vehicle, or the outer surface of an automotive part.

That is, the radome of the radar sensor may be disposed inside a grill, a bumper, or a body of a vehicle or may be formed as a portion of a part forming the outer surface of a vehicle such as a grill, a bumper, and a portion of the body of a vehicle, thereby being able to improve the aesthetic appearance of the vehicle and convenience of mounting the radar sensor.

FIG. 1B is a block diagram of an apparatus for detecting a moving target according to an embodiment of the present disclosure.

Referring to FIG. 1B, the apparatus for detecting a moving target may include a transceiver, a frequency mixer, a multi-clutter determiner, a first moving component extractor, a second moving component extractor, and a moving target determiner. According to an embodiment, the transceiver and the frequency mixer may be implemented in a radar module. The multi-clutter determiner, the first moving component extractor, the second moving component extractor, and the moving target determiner may be included in the controller. Hereinafter, the operation of the controller will be described by the operations of each of the multi-clutter determiner, the first moving component extractor, the second moving component extractor, and the moving target determiner.

The transceiver scans the space around a vehicle equipped with the apparatus for detecting a moving target. In detail, the transceiver can transmit a pulse type transmitted signal and receive a received signal produced by the transmitted signal reflected by an object to scan the space around a vehicle.

In an embodiment, the transceiver may use a Frequency Modulated Continuous (FMCW) method.

In an embodiment, the transceiver can scan a surrounding area periodically or non-periodically. For example, the transceiver can perform first scanning and second scanning with predetermined time intervals.

The frequency mixer extracts a beat frequency. In detail, the frequency mixer can calculate a beat frequency by mixing a received signal and a transmitted signal of the transceiver. The multi-clutter determiner determines whether it is a multi-clutter environment. In detail, the multi-clutter determiner can detect a moving component from the beat frequency produced by the frequency mixer. The multi-clutter determiner can determine that it is a multi-clutter environment when a moving component is not detected from the beat frequency. The moving component may mean a component, which has a high possibility to be determined as a moving component, of the beat frequency.

First moving component extractor extracts a first moving component based on the beat frequency. The first moving component may mean a component, which has a high possibility to be determined as a moving component, of the beat frequency.

The second moving component extractor can extract a second moving component based on the beat frequency (hereafter, referred to as a first beat frequency), which is produced by the frequency mixer based on a transmitted signal and a received signal in first scanning, and a beat frequency (hereafter, referred to as a second beat frequency), which is produced by the frequency mixer based on a transmitted signal and a received signal in second scanning performed with a predetermined time interval from the first scanning.

The moving target determiner determines a moving target. In detail, the moving target determiner can determine whether it is a moving target based on a first moving component and a second moving component. In detail, the moving target determiner can determine whether a target corresponding to a corresponding frequency is a moving target based on the result of determination on a first moving component and a second moving component that have the same or overlapping frequency.

The moving target determiner can determine that a moving component calculated by the multi-clutter determiner as a moving target.

That is, the controller can detect a moving target at least partially on the basis processing of the first beat frequency and the second beat frequency.

Figure 1C:
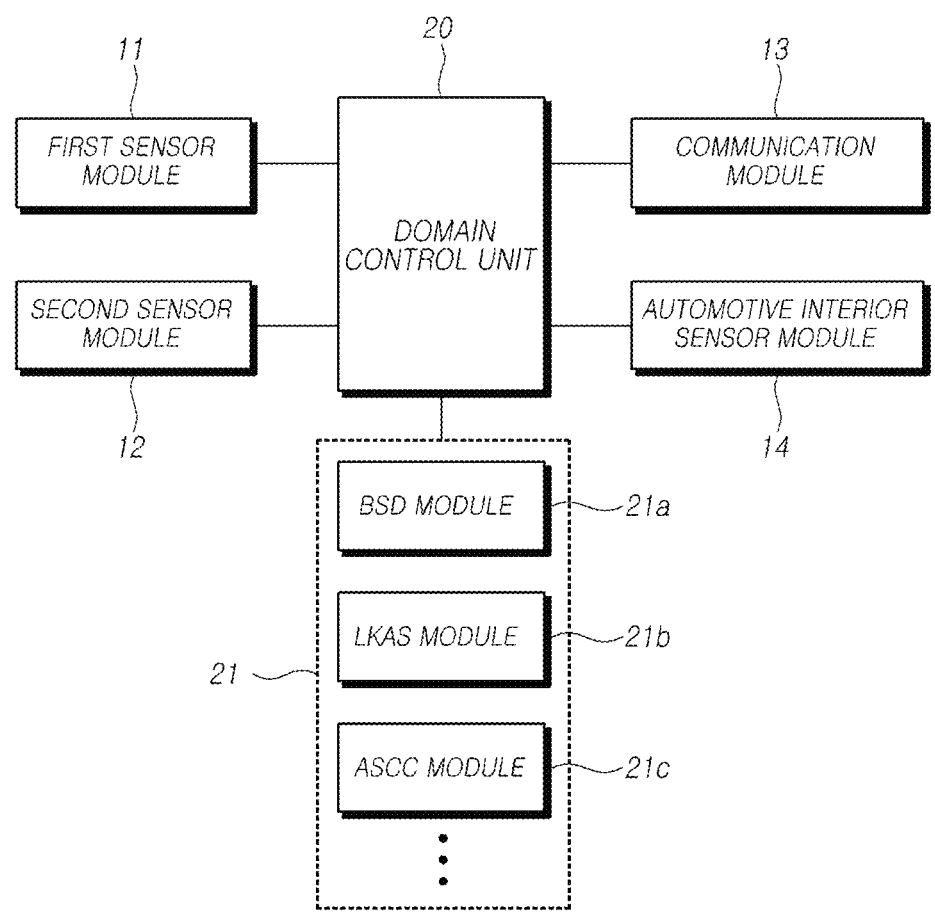
FIG. 1C is a block diagram of a vehicle according to another embodiment of the present disclosure.

FIG. 1C is a block diagram of a vehicle according to another embodiment of the present disclosure.

Referring to FIG. 1C, a vehicle may include at least one of the first sensor module 11, the second sensor module 12, the communication module 13, and the automotive interior sensor module 14. They were described with reference to FIG. 1A, so they are not described here.

The vehicle may further include a Domain Control Unit (DCU) 20.

The DCU 20 may be configured to receive captured image data from at least one image sensor, receive captured sensing data from a plurality of second sensors, and process at least one of the image data or the sensing data. For this processing, the DCU 20 may include at least one processor.

The DCU 20 can transmit/receive data to/from at least one of the first sensor module 11, the second sensor module 12, the communication module 13, the automotive interior sensor module 14, and a driver assist system module 21 and can process the data from the at least one of the modules. That is, the DCU 20 can be disposed in a vehicle and can communicate with at least one module in the vehicle. To this end, the DCU 20 may further include an appropriate data link or communication link such as a vehicle network bus for data transmission or signal communication.

The DCU 20 can be operated to control one or more of several Driver Assist Systems (DAS) that are used for vehicles. For example, the DCU 20 can determine a specific situation, a condition, occurrence of an event, and control operation performance based on data obtained from at least one of the modules 11, 12, 13, 14, and 21.

The DCU 20 can receive signals for controlling the operations of various DAS modules 21 disposed in a vehicle using the determined information. For example, the DAS module 21 may include a Blind Spot Detection (BSD) system module 21a, a Lane Keeping Assist System (LKAS) module 21b, and an Adaptive Smart Cruise Control (ASCC) system module 21c.

According to an embodiment of the present disclosure, the DAS module 21 in a vehicle may include at least one system selected from a group of an autonomous driving system, a semi-autonomous driving system, an automated parking system, a blind spot detection system, a cross traffic alert system, a lane change and merge aid system, an automatic emergency braking system, a pedestrian detection system, and a turn assist & intersection collision mitigation system. The term and name "DAS" are an example and the present disclosure is not limited thereto. Further, the DAS module 21 may include a self-driving module for self-driving. Alternatively, the DCU can control a vehicle to perform self-driving by controlling the system modules included in the DAS module 21.

The DCU 20 determines whether it is a multi-clutter environment. In detail, the DCU 20 can detect a moving component from the beat frequency produced by the frequency mixer. The DCU 20 can determine that it is a multi-clutter environment when a moving component is not detected from the beat frequency. The moving component may mean a component, which has a high possibility to be determined as a moving component, of the beat frequency.

The DCU 20 extracts a first moving component based on the beat frequency. The first moving component may mean a component, which has a high possibility to be determined as a moving component, of the beat frequency.

The DCU 20 can extract a second moving component based on the beat frequency (hereafter, referred to as a first beat frequency), which is produced by the frequency mixer based on a transmitted signal and a received signal in first scanning, and a beat frequency (hereafter, referred to as a second beat frequency), which is produced by the frequency mixer based on a transmitted signal and a received signal in second scanning performed with a predetermined time interval from the first scanning.

The DCU 20 determines a moving target. In detail, the DCU 20 can determine whether it is a moving target based on a first moving component and a second moving component. In detail, the DCU 20 can determine whether a target corresponding to a corresponding frequency is a moving target based on the result of determination on a first moving component and a second moving component that have the same or overlapping frequency.

That is, the DCU 20 can extract a moving target by processing the first beat frequency and the second beat frequency. Although the above description is based on that the frequency mixer is included in the radar module, the present disclosure is not limited thereto. According to an embodiment, the frequency mixer may also be integrated in the DCU 20.

The apparatus for detecting a moving target shown in FIG. 1B is described hereafter in detail with reference to FIGS. 2 to 10. The following description is based on the controller 10 and the components of the controller 10 described with reference to FIG. 1A, but the present disclosure is not limited thereto. The operations of the controller 10 and the components of the controller 10 to be described hereafter can be performed substantially in the same way in the DCU 20 described with reference to FIG. 1C except for non-applicable operations.

Figure 2:
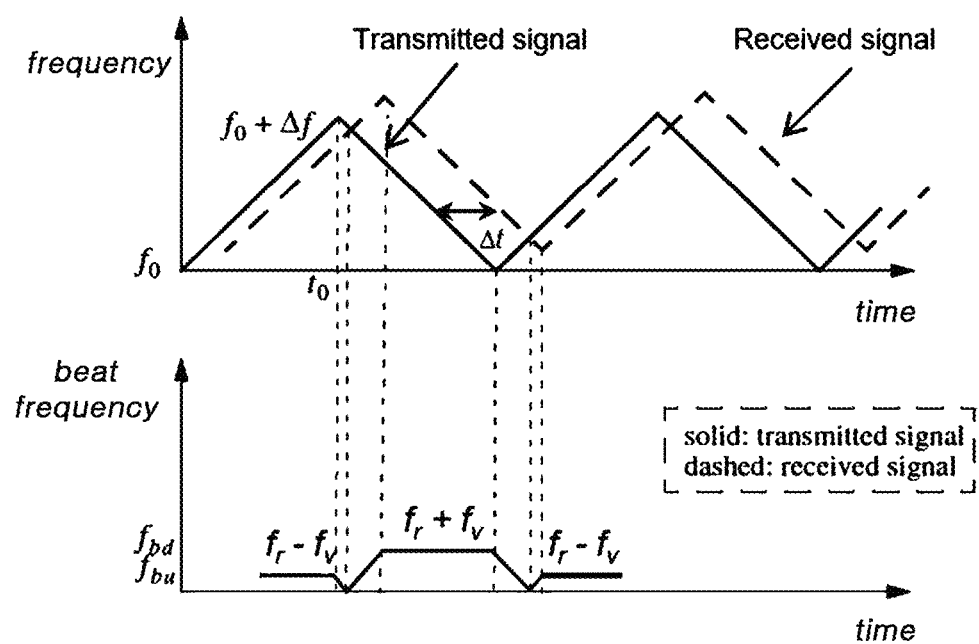
FIG. 2 is a diagram illustrating a beat frequency according to an embodiment of the present disclosure.

FIG. 2 is a diagram illustrating a beat frequency according to an embodiment of the present disclosure.

Referring FIG. 2, a transmitted signal, a received signal, and a beat frequency were shown in a frequency domain. In FIG. 2, $f_0$=beginning point of frequency modulation, f=frequency bandwidth of transmitted signal, to =sweep time of chirp signal, t=time delay of received signal, $f_{bu}$=frequency shift of up-chirp=$f_r-f_v$, $f_{bd}$=frequency shift of down-chirp=$f_r+f_v$, $f_r$=frequency shift due to time delay of target, and $f_v$=frequency shift due to relative speed of target.

$f_r$ can be obtained from the following Equation 1.

$$f_r = \Delta t \times \frac{df}{dt} = \frac{2R}{c} \times \frac{df}{dt} \qquad \text{[Equation 1]}$$

$f_v$ can be obtained from the following Equation 2.

$$f_v = \frac{2V}{c} \times f = \frac{2V}{\lambda} \qquad \text{[Equation 2]}$$

$f_{bu}$ and $f_{bd}$ can be obtained from the following Equation 3.

$$f_{bu} = f_r - f_v = \frac{2R}{c} \times \frac{df}{dt} - \frac{2V}{\lambda} \qquad \text{[Equation 3]}$$
$$f_{bd} = f_r + f_v = \frac{2R}{c} \times \frac{df}{dt} + \frac{2V}{\lambda}$$

R can be obtained from the following Equation 4.

$$R = \frac{ct_0}{4\Delta f}(f_{bu} + f_{bd}) = \frac{ct_0 f_r}{2\Delta f} \qquad \text{[Equation 4]}$$
$$\rightarrow \Delta R = \frac{ct_0 \Delta f_r}{2\Delta f} = \frac{ct_0 f_{sample}}{2\Delta fN}$$

A vehicle speed V can be obtained from the following Equation 5.

$$V = -\frac{\lambda}{4}(f_{bu} - f_{bd}) = \frac{\lambda f_v}{2} \qquad \text{[Equation 5]}$$

Figure 3:
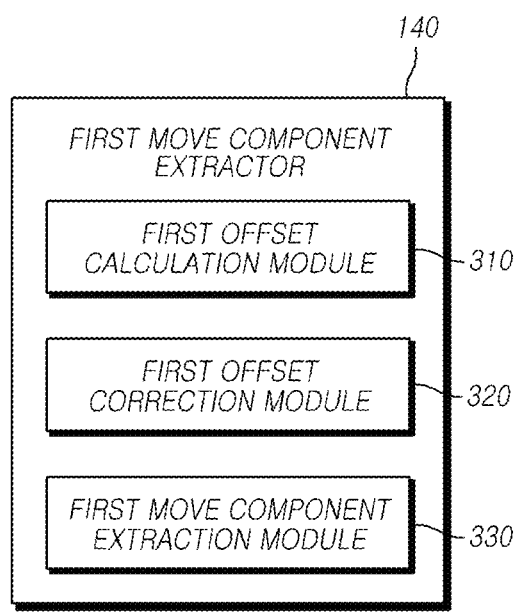
FIGS. 3 to 5 are diagrams illustrating first moving component extraction according to an embodiment of the present disclosure.
Figure 4:
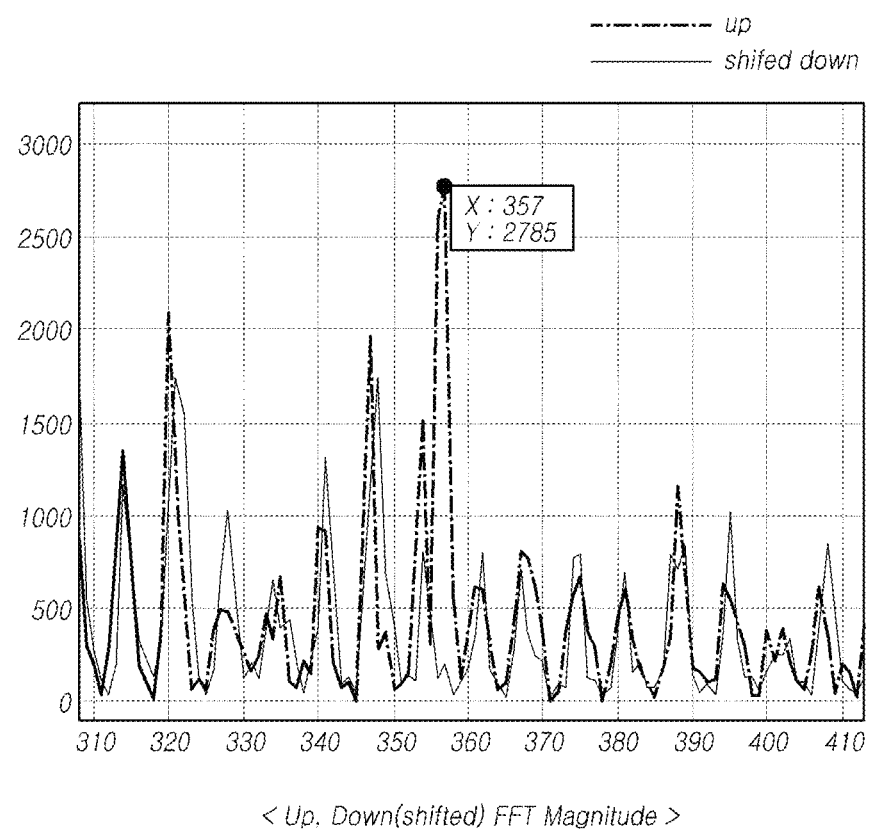
Figure 5:
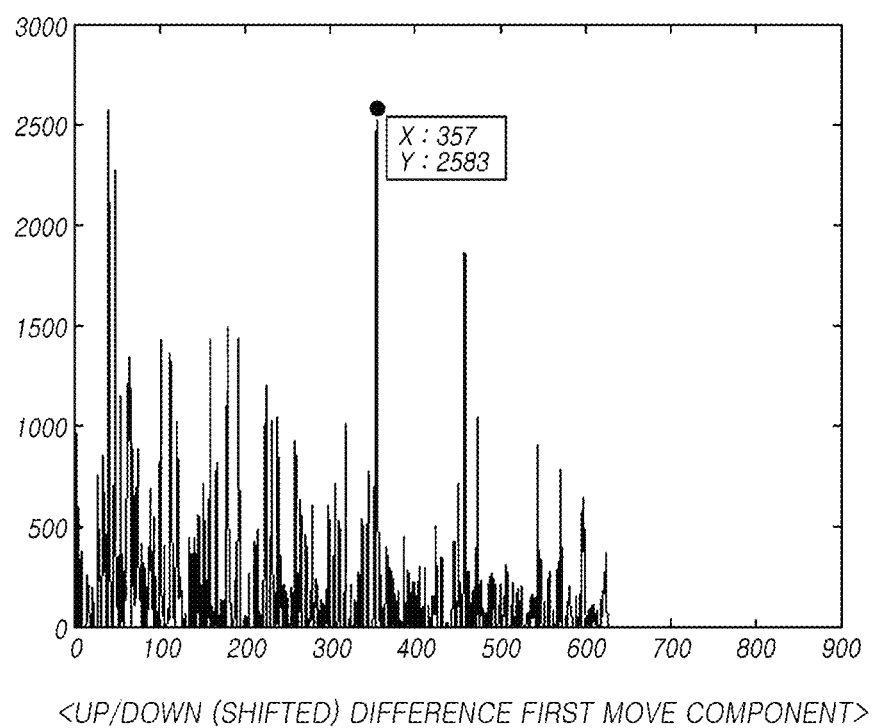

FIGS. 3 to 5 are diagrams illustrating first moving component extraction according to an embodiment of the present disclosure.

FIG. 3 is a block diagram of the first moving component extractor according to an embodiment of the present disclosure.

Referring to FIG. 3, the first moving component extractor may include a first offset calculation module, a first offset correction module, and a first moving component extraction module.

The first offset calculation module can calculate a first offset value that is the offset value of an up-chirp period and a down-chirp period of a beat frequency.

In an embodiment, the first offset calculation module can calculate a first offset value that is the offset value between an up-chirp period and a down-chirp period of a beat frequency after performing fast Fourier transform. The first offset value may mean an index (frequency) difference in a frequency domain.

The first offset value $\Delta f_{ud}$ can be obtained through the following Equations 6 to 8.

$$f_{k,up}(i) = f_{k,r}(i) - f_{k,d}(i) \qquad \text{[Equation 6]}$$

where $f_{k,up}(i)$ is an up-chirp period frequency of k-th scanning, $f_{k,r}(i)$ is frequency shift of a target according to a delay time in the k-th scanning, and $f_{k,d}(i)$ is a Doppler frequency of an object in the k-th scanning.

$$f_{k,down}(i) = f_{k,r}(i) + f_{k,d}(i) \qquad \text{[Equation 7]}$$

where $f_{k,down}(i)$ is a down-chirp period frequency in the k-th scanning.

$$\Delta f_{ud} = f_{k,down}(i) - f_{k,up}(i) = 2f_{k,d}(i) = 2\frac{2f_c}{c}v_r(i) \qquad \text{[Equation 8]}$$

where $v_r(i)$ is the speed of a vehicle equipped with the apparatus for detecting a target.

That is, stopped objects around a vehicle have relative speeds to the speed of the vehicle, so they have Doppler frequencies by $v_r(i)$ in the opposite direction to the traveling direction of the vehicle. Accordingly, it is possible to calculate the first offset value only from the speed $v_r(i)$ of the vehicle.

The first offset correction module can correct any one of the up-chirp period and the down-chirp period based on the first offset value. In detail, the first offset correction module can shift the index of any one of the up-chirp period and the down-chirp period based on the first offset value. Referring to FIG. 4, as an example of correcting a first offset value, the result of shifting an up-chirp period and a down-chirp period by a first offset value is shown.

A first moving component extraction module can correct any one of the up-chirp period or the down-chirp period based on the first offset value, compare them, and then extract the difference as a first moving component. Referring to FIG. 5, a magnitude difference of the result of shifting the up-chirp period and the down-chirp period shown in FIG. 4 by the first offset value is shown.

Figure 6:
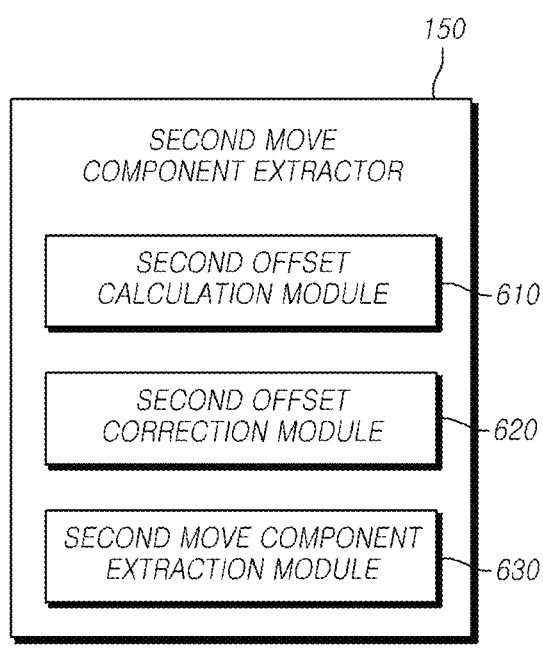
FIGS. 6 are 7 are diagrams illustrating second moving component extraction according to an embodiment of the present disclosure.
Figure 7:
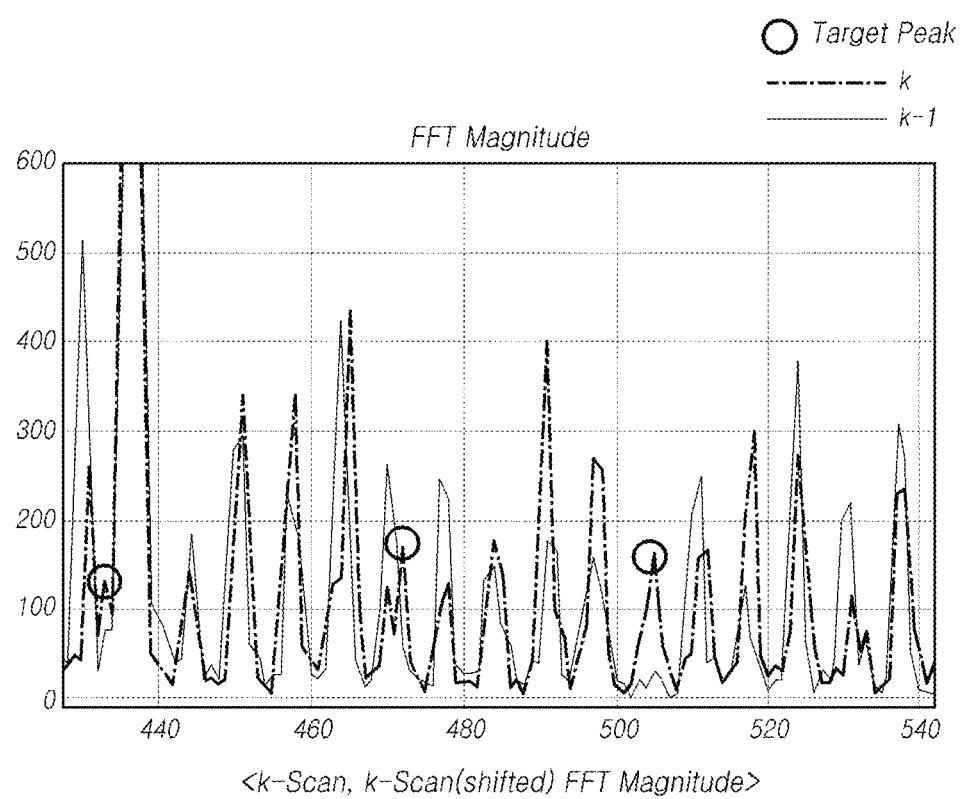

FIGS. 6 to 7 are diagrams illustrating second moving component extraction.

FIG. 6 is a block diagram of the second moving component extractor according to an embodiment of the present disclosure.

Referring to FIG. 6, the second moving component extractor may include a second offset calculation module, a second offset correction module, and a second moving component extraction module.

The second offset calculation module can calculate a second offset value that is the offset value between a first beat frequency and a second beat frequency.

In an embodiment, the second offset calculation module can calculate a second offset value between up-chirp periods or down-chirp periods of the first beat frequency and the second beat frequency after performing fast Fourier transform. The second offset value may mean an index (frequency) difference in a frequency domain.

The second offset value $\Delta f_r$ can be obtained through the following Equations 9 to 12.

$$f_k(i) = f_{k,r}(i) - f_{k,d}(i) \quad \text{[Equation 9]}$$

where $f_k(i)$ is a k-th beat frequency calculated by k-th scanning, $f_{k,r}(i)$ is frequency shift of a target according to a delay time in the k-th scanning, and $f_{k,d}(i)$ is a Doppler frequency of an object in the k-th scanning.

$$f_{k,d}(i) = f_{k-1,d}(i) = \frac{2f_c}{c} v_r(i) = \frac{2}{\lambda} v_r(i) \quad \text{[Equation 10]}$$

That is, if the speed $v_r(i)$ of a vehicle is constant, the Doppler frequency of a target in first scanning and the Doppler frequency of the target in second scanning are the same, and the value can be constant.

$$f_{k,r}(i) = \frac{2\alpha}{c} R_k(i), \, f_{k-1,r}(i) = \frac{2\alpha}{c} R_{k-1}(i) \quad \text{[Equation 11]}$$

The frequency difference according to the distance to a target in k-th and k−1-th scanning depends on the distance between the target and the vehicle at each point of time of scanning.

$$\Delta f_r = \frac{2\alpha}{c}(R_k(i) - R_{k-1}(i)) = \frac{2\alpha}{c} v_r(i) T_{scan} \quad \text{[Equation 12]}$$

where $\Delta f_r$ is a second offset value that is the offset value between beat frequencies in k-th and k−1-th scanning and it is a vehicle speed $v_r(i)$ and a predetermined time interval $T_{scan}$ at which scanning is performed.

The second offset correction module corrects the first beat frequency or the second beat frequency based on the second offset value.

In an embodiment, the second offset correction module can correct the second offset value in a frequency domain. For example, when the second offset value is a frequency, the second offset correction module can correct the first beat frequency or the second beat frequency by the frequency that is the second offset value in the frequency domain.

A second moving component extraction module can extract a second moving component by comparing the first beat frequency and the second beat frequency. In detail, the second moving component extraction module can compare the first beat frequency and the second beat frequency corrected based on the second offset value and then can extract the difference as a second moving component. Referring to FIG. 7, a beat frequency of k-th scanning and a beat frequency of k−1-th scanning corrected as much as the second offset value are shown. Comparing two beat frequencies shown in FIG. 7, there is a frequency component, which does not overlap the peak value of the k−1-th beat frequency, in the peak value of the k-th beat frequency and it is a second moving component having a high possibility to be determined as a moving target.

Figure 8:
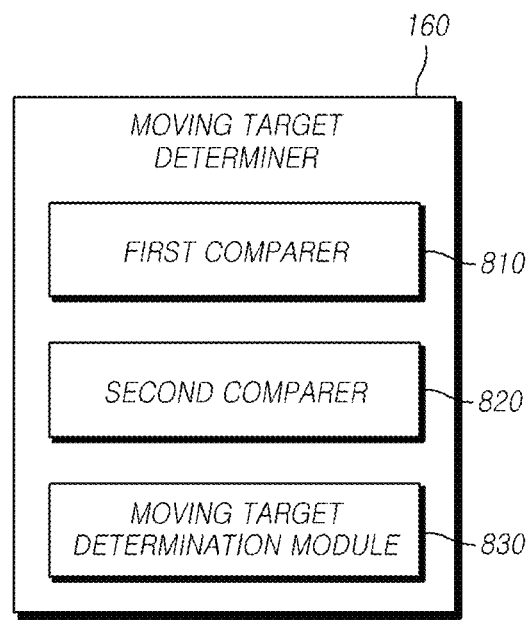
FIG. 8 is a block diagram of a moving component determiner according to an embodiment of the present disclosure.

FIG. 8 is a block diagram of a moving target determiner according to an embodiment of the present disclosure.

Referring to FIG. 8, the moving target determiner includes a first comparer, a second comparer, and a moving target determination module.

The first comparer compares a first moving component with a predetermined first reference value. In detail, the first comparer can determine whether the magnitude of a first moving component is larger than the first reference value by comparing the magnitude of the first moving component with the first reference value. The first comparer can determine the difference between the magnitude of the first moving component and the first reference value. The first reference value can be experimentally determined for moving target determination and can be variably set in accordance with the method of implementing the apparatus for detecting a target, the climate, and the configuration of the ground.

The second comparer compares a second moving component with a predetermined second reference value. In detail, the second comparer can determine whether the magnitude of a first moving component is larger than the second reference value by comparing the magnitude of the second moving component with the second reference value. The second comparer can determine the difference between the magnitude of the first moving component and the second reference value. The second reference value can be experimentally determined for moving target determination and can be variably set in accordance with the method of implementing the apparatus for detecting a target, the climate, and the configuration of the ground.

The moving target determination module can determine whether there is a moving target based on the determination result by the first comparer and the determination result by the second comparer.

In an embodiment, when the first comparer determines that the magnitude of the first moving component is larger than the first reference value and the second comparer determines that the magnitude of the second moving component is larger than the second reference value, the moving target determination module can determine that there is a moving target.

In an embodiment, the moving target determination module can determine whether there is a moving target by reflecting a weight to the determination result by the first comparer and the determination result by the second comparer. For example, when a weight of 0.4 is set for the determination result by the first comparer and a weight of 0.6 is set for the determination result by the second comparer and when the result of multiplying the difference between the first moving component determined by the first comparer and the first reference value by 0.4 and the result of multiplying the difference between the second moving component determined by the second comparer and the second reference value by 0.6 are larger than a predetermined third reference value, the moving target determination module can determine it s a moving target. The weights and the third reference value can be experimentally determined and can be variably set in accordance with the method of implementing the apparatus for detecting a target, the climate, and the environment.

Figure 9:
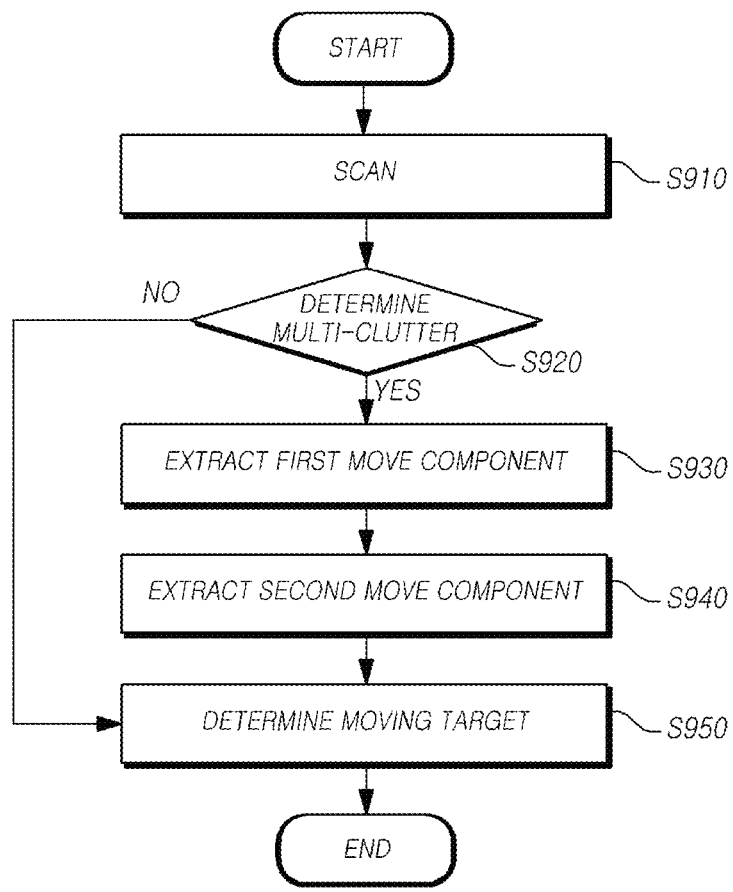
FIG. 9 is a flowchart showing a method of detecting a moving target according to an embodiment of the present disclosure.

Alternatively, in an embodiment, the moving target determination module can give a predetermined weight to the first beat frequency and the second beat frequency and then can compare the values with corresponding reference values through the first comparer and the second comparer. In this case, the magnitudes of the first and second moving components are relatively increased, so a moving component can be more accurately determined. FIG. 9 is a flowchart of a method of detecting a moving target according to an embodiment of the present disclosure.

It is exemplified in the following description that the method shown in FIG. 9 is performed by the apparatus for detecting a moving target shown in FIG. 1B. It is apparent that the above description related to the apparatus for detecting a moving target shown in FIG. 1B can be applied to the method of detecting a moving target shown in FIG. 9.

Referring to FIG. 9, the space around a vehicle is scanned in step S910. In detail, the apparatus for detecting a moving target transmits a pulse type transmitted signal for detecting a target around a vehicle and receives a received signal of the transmitted signal reflected by a target. The apparatus for detecting a moving target generates a beat frequency based on the transmitted signal and the received signal.

In step S920, a multi-clutter environment is determined. In detail, the apparatus for detecting a moving target can determine that it is a multi-clutter environment when a moving target is not detected from the beat frequency. The apparatus for detecting a moving target can determine that it is a multi-clutter environment when a moving component is not detected from the beat frequency. The moving component may mean a component, which has a high possibility to be determined as a moving component, of the beat frequency.

In step S930, a first moving component is extracted. In detail, the apparatus for detecting a moving target can extract a first moving component by comparing an up-chirp period and a down-chirp period of the beat frequency.

In step S940, a second moving component is extracted. In detail, the apparatus for detecting a moving target can extract a second moving component by comparing the beat frequency of first scanning and the beat frequency of second scanning.

In step S950, a moving target is determined. In detail, the apparatus for detecting a moving target can determine whether there is a moving target based on the first moving component and the second moving component.

The methods according to the exemplary embodiments of the present disclosure may be in a form of program commands executed through various computer means to be recorded in a computer readable medium. The computer readable medium may include a program command, a data file, a data structure, and the like independently or in combination.

The program command recorded in the computer-readable medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. The computer-readable recording media may be transmission media such as light, a metal wire, or a waveguide including a carrier for carrying a signal designating program instructions, data structures, and the like. Examples of the program command include a machine language code generated by a compiler and a high-level language code executable by a computer through an interpreter and the like.

The aforementioned hardware device may be configured to operate as one or more software modules in order to perform the operation of the present disclosure, and vice versa.

The present disclosure has been described above in connection with the embodiments thereof. It will be understood by those skilled in the art to which the present disclosure belongs that the present disclosure may be implemented in modified forms without departing from the essential characteristics of the present disclosure. Therefore, the embodiments disclosed herein should be considered from an illustrative point of view, rather than a limitative point of view. The scope of the present disclosure is found not in the above description but in the accompanying claims, and all differences falling within the scope equivalent to the claims should be construed as being included in the present disclosure.

What is claimed is:

1. An apparatus for detecting a moving target, the apparatus comprising:
   a frequency mixer configured to calculate a first beat frequency based on a transmitted signal and a received signal of first scanning and calculate a second beat frequency based on a transmitted signal and a received signal of second scanning performed with a predetermined time interval from the first scanning; and
   a controller configured to:
   extract a first moving component by comparing an up-chirp period frequency and a down-chirp period frequency of the first beat frequency; and
   extract a second moving component by comparing up-chirp period frequencies or down-chirp period frequencies of the first beat frequency and the second beat frequency; and
   determine whether there is the moving target based on the first moving component and the second moving component.

2. The apparatus of claim 1, wherein the controller is configured to:
   calculate a first offset value between the up-chirp period frequency and the down-chirp period frequency;
   correct any one of the up-chirp period frequency and the down-chirp period frequency based on the first offset value; and
   extract the first moving component by comparing corrected one and non-corrected one of the up-chirp period frequency and the down-chirp period frequency.

3. The apparatus of claim 2, wherein the controller calculates the first offset value based on a moving speed of the apparatus that performs the first scanning and the second scanning.

4. The apparatus of claim 1, wherein the controller is configured to:
   calculate a second offset value between the first beat frequency and the second beat frequency;
   correct any one of the first beat frequency and the second beat frequency based on the second offset value; and
   extract the second moving component by comparing corrected one and non-corrected one of the first beat frequency and the second beat frequency.

5. The apparatus of claim 4, wherein the controller calculates the second offset value based on a moving speed of the apparatus that performs the first scanning and the second scanning and the predetermined time interval.

6. The apparatus of claim 1, wherein the controller is configured to:
   compare the first moving component and a first reference value;
   compare the second moving component and a second reference value; and
   determine whether there is the moving target based on each comparing result.

7. The apparatus of claim 6, wherein the first moving component has the same frequency with the second moving component.

8. The apparatus of claim 6, wherein the controller determines that there is the moving target when the first moving component is larger than the first reference value and the second moving component is larger than the second reference value.

9. The apparatus of claim 6, wherein the controller determines whether there is the moving target by giving a weight to each comparing result.

10. An apparatus for detecting a moving target, the apparatus comprising:
a frequency mixer configured to calculate a first beat frequency based on a transmitted signal and a received signal of first scanning and calculate a second beat frequency based on a transmitted signal and a received signal of second scanning performed with a predetermined time interval from the first scanning; and
a domain control unit configured to control at least one driver assist system module mounted to a vehicle,
wherein the domain control unit is configured to: extract a first moving component by comparing an up-chirp period frequency and a down-chirp period frequency of the first beat frequency; extract a second moving component by comparing up-chirp period frequencies or down-chirp period frequencies of the first beat frequency and the second beat frequency; and determine whether there is the moving target based on the first moving component and the second moving component.

11. The apparatus of claim 10, wherein the driver assist system module comprises at least one system selected from a group of an autonomous driving system, a semi-autonomous driving system, an automated parking system, a blind spot detection system, a cross traffic alert system, a lane change and merge aid system, an automatic emergency braking system, a pedestrian detection system, and a turn assist & intersection collision mitigation system.

12. The apparatus of claim 10, wherein the domain control unit is configured to:
calculate a first offset value between the up-chirp period frequency and the down-chirp period frequency based on a moving speed of the apparatus that performs the first scanning and the second scanning;
correct any one of the up-chirp period frequency and the down-chirp period frequency based on the first offset value; and
extract the first moving component by comparing corrected one and non-corrected one of the up-chirp period frequency and the down-chirp period frequency.

13. The apparatus of claim 10, wherein the domain control unit is configured to:
calculate a second offset value between the first beat frequency and the second beat frequency based on a moving speed of the apparatus that performs the first scanning and the second scanning and a predetermined time interval;
correct any one of the first beat frequency and the second beat frequency based on the second offset value; and
extract the second moving component by comparing corrected one and non-corrected one of the first beat frequency and the second beat frequency.

14. The apparatus of claim 10, wherein the domain control unit compares the first moving component and a first reference value, compares the second moving component and a second reference value, and determines whether there is the moving target based on the first moving component and the second moving component that have the same frequency.

15. A method of detecting a moving target, the method comprising:
calculating a first beat frequency based on a transmitted signal and a received signal of first scanning and calculating a second beat frequency based on a transmitted signal and a received signal of second scanning performed with a predetermined time interval from the first scanning;
extracting a first moving component by comparing an up-chirp period frequency and a down-chirp period frequency of at least one of the first beat frequency or the second beat frequency;
extracting a second moving component by comparing up-chirp period frequencies or down-chirp period frequencies of the first beat frequency and the second beat frequency; and
determining whether there is the moving target based on the first moving component and the second moving component.

* * * * *